(12) United States Patent
Noda (10) Patent No.: US 8,533,587 B2
(45) Date of Patent: Sep. 10, 2013

(54) WEB SERVER, WEB SERVER HAVING FUNCTION OF JAVA SERVLET, AND COMPUTER READABLE MEDIUM

(75) Inventor: Toru Noda, Osaka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/720,060

(22) Filed: Nov. 25, 2003

(65) Prior Publication Data

US 2004/0107423 A1   Jun. 3, 2004

(30) Foreign Application Priority Data

Nov. 27, 2002 (JP) ................................ 2002-343616

(51) Int. Cl.
*G06F 17/26* (2006.01)
*G06F 17/27* (2006.01)

(52) U.S. Cl.
USPC .......................................... 715/234; 709/224

(58) Field of Classification Search
USPC ........................................ 715/513, 517, 234
See application file for complete search history.

(56) References Cited

U.S. PATENT DOCUMENTS

| | | | | | |
|---|---|---|---|---|---|
| 5,987,454 | A | * | 11/1999 | Hobbs .............................. | 707/4 |
| 5,987,480 | A | * | 11/1999 | Donohue et al. .............. | 715/207 |
| 5,999,912 | A | * | 12/1999 | Wodarz et al. .............. | 705/14.61 |
| 6,081,937 | A | * | 7/2000 | Whitacre ........................ | 4/300.3 |
| 6,094,662 | A | * | 7/2000 | Hawes ........................ | 707/104.1 |
| 6,101,486 | A | * | 8/2000 | Roberts et al. .............. | 705/14.66 |
| 6,119,247 | A | * | 9/2000 | House et al. ................ | 714/38.14 |
| 6,286,043 | B1 | * | 9/2001 | Cuomo et al. ................ | 709/223 |
| 6,526,406 | B1 | | 2/2003 | Suzuki et al. | |
| 6,535,912 | B1 | * | 3/2003 | Anupam et al. .............. | 709/217 |
| 6,557,038 | B1 | * | 4/2003 | Becker et al. ................ | 709/227 |
| 6,591,266 | B1 | * | 7/2003 | Li et al. .......................... | 707/10 |
| 6,594,697 | B1 | * | 7/2003 | Praitis et al. .................. | 709/225 |
| 6,604,106 | B1 | * | 8/2003 | Bodin et al. .................. | 707/101 |
| 6,622,168 | B1 | * | 9/2003 | Datta ............................ | 709/219 |
| 6,657,660 | B2 | * | 12/2003 | Shiota et al. .................. | 348/714 |
| 6,697,825 | B1 | * | 2/2004 | Underwood et al. ......... | 715/207 |
| 6,697,849 | B1 | * | 2/2004 | Carlson ........................ | 709/219 |

(Continued)

FOREIGN PATENT DOCUMENTS

| | | |
|---|---|---|
| JP | 8-50555 | 2/1996 |
| JP | 2000-20542 | 1/2000 |

(Continued)

OTHER PUBLICATIONS

Rahul Tyagi; "Get an Overview of the JavaServer Faces Technology"; Builder.com;Oct. 9, 2003; pp. 1-2.*

(Continued)

*Primary Examiner* — James Debrow
(74) *Attorney, Agent, or Firm* — Staas & Halsey LLP (57) ABSTRACT

A Web server for transmitting a Web page to a terminal device of a user via a network includes a dynamic part operation portion for determining contents of a dynamic part of a Web page in accordance with a parameter designated by a user, a dynamic part process portion for performing a process of making a data memory portion store the contents of the dynamic part determined by the dynamic part operation portion in connection with the Web page and the user, a Web page generating portion for generating a Web page in accordance with the determined contents of the dynamic part and a Web page transmission portion for transmitting the generated Web page to the terminal device.

12 Claims, 11 Drawing Sheets

(56) References Cited

U.S. PATENT DOCUMENTS

| | | | |
|---|---|---|---|
| 6,826,594 B1* | 11/2004 | Pettersen | 709/203 |
| 6,973,626 B1* | 12/2005 | Lahti et al. | 715/763 |
| 7,000,008 B2* | 2/2006 | Bautista-Lloyd et al. | 709/219 |
| 7,069,292 B2* | 6/2006 | Sugahara | 709/203 |
| 7,093,193 B1* | 8/2006 | Goldberg | 715/207 |
| 7,234,107 B1* | 6/2007 | Aoki et al. | 715/207 |
| 7,275,085 B1* | 9/2007 | Tran | 709/217 |
| 7,398,216 B2* | 7/2008 | Barnett et al. | 705/1.1 |
| 7,506,286 B2* | 3/2009 | Beardslee et al. | 716/136 |
| 2001/0011235 A1* | 8/2001 | Kim et al. | 705/26 |
| 2002/0065851 A1* | 5/2002 | Watson et al. | 707/513 |
| 2002/0065912 A1* | 5/2002 | Catchpole et al. | 709/224 |
| 2002/0188696 A1* | 12/2002 | Ullmann et al. | 709/219 |
| 2003/0088554 A1* | 5/2003 | Ryan et al. | 707/3 |
| 2003/0110315 A1* | 6/2003 | Upton | 709/328 |
| 2004/0078695 A1* | 4/2004 | Bowers et al. | 714/39 |
| 2004/0177015 A1* | 9/2004 | Galai et al. | 705/35 |
| 2005/0005163 A1* | 1/2005 | Kirkpatrick et al. | 713/201 |
| 2005/0204276 A1* | 9/2005 | Hosea et al. | 715/501.1 |
| 2006/0112172 A1* | 5/2006 | Isaac et al. | 709/218 |
| 2008/0196084 A1* | 8/2008 | Hawkes | 726/2 |

FOREIGN PATENT DOCUMENTS

| | | |
|---|---|---|
| JP | 2000-163440 | 6/2000 |
| JP | 2001-56810 | 2/2001 |
| JP | 2001-67366 | 3/2001 |
| JP | 2001-84264 | 3/2001 |

OTHER PUBLICATIONS

Doug Wetzel; "Java Servlets"1999; Linux Journal; pp. 1-7.*
Ardissono et al.,"An Agent Architecture for Personalized Web Stores",1999, ACM, pp. 182-189.*
Datta et al.,"An architecture to support scalable online personalization on the Web", Aug. 2001, The VLDB Journal, pp. 104-117.*
Lin et al.,"Taking the Byte Out of Cookies: privacy, Consent, and the Web", Computer and Society, Jun. 1998, pp. 39-51.*
Datta et al., "Proxy-Based Acceleration of Dynamic Generated Content on the World Wide Web: An Approach and Implementation", ACM, 2002, pp. 97-108.*
Ko et al.,"Dynamic Coordination of Information Management Services for Processing Dynamic Web Content", ACM, 2002, pp. 355-365.*
Brodie et al. "Keyword-based Fragment Detection for Dynamic Web Content Delivery", ACM, 2004, pp. 298-299.*
Singer et al.,"Dynamic Analysis of Program Concepts in Java", ACM, 2006, pp. 31-39.*
Yeh et al.,"Tracking the Changes of Dynamic web Pages in the Existence of URL Rewriting", Australian Computer Society, 2006, pp. 169-176.*
Dell et al., "Web User Session Reconstruction Using Integer Programming", 2008, IEEE, pp. 385-388.*
Japanese Patent Office Notification of Reasons for Refusal, mailed Jan. 16, 2007, and issued in priority Japanese Patent Application No. 2002-343616.

* cited by examiner

```
20021011 185100.102:FWLOG:Thread-9:Created Document Object.         ---- (a1)
20021011 185100.122:FWLOG:Thread-9:X TAG START Log Write::GID02::A123 ---- (a2)
FRAME_WORK:<X>:Name:?? ICHIRO                    81                  ---- (a3)
FRAME_WORK:<X>:Address:SHIROMI, CHUOKU, OSAKA-CITY  81               ---- (a4)
X TAG END Log Write                                                  ---- (a5)
20021011 185100.132:FWLOG:Thread-9:HTML Document generated.          ---- (a6)
                                                          } 80a
...

20021011 193528.202:FWLOG:Thread-9:Created Document Object.          ---- (b1)
20021011 193528.222:FWLOG:Thread-9:X TAG START Log Write::GID03::1234 ---- (b2)
FRAME_WORK:<X>:USER_NAME:tom       81                                ---- (b3)
FRAME_WORK:<X>:USER_ID:1234        81                                ---- (b4)
FRAME_WORK:<X>:SEARCH_KEY:121      81                                ---- (b5)
X TAG END Log Write                                                  ---- (b6)
20021011 193528.232:FWLOG:Thread-9:HTML Document generated.          ---- (b7)
                                                          } 80b
...
```

```
Sample Search Page : GID03              _ □ ×
 ← → ↶ ⌂ ⊗

Search Page : GID03
  ─────────────────────────────

USER >> tom(1234)
              ↑    ↑
             MV   MV

Search Key  [ 121 ]        SEARCH
                   ↑
                  MV
```

FIG.11

WEB SERVER, WEB SERVER HAVING FUNCTION OF JAVA SERVLET, AND COMPUTER READABLE MEDIUM

BACKGROUND OF THE INVENTION

1. Field of the Invention

The present invention relates to a Web server for producing a Web page in accordance with a parameter designated by a user and transmitting the Web page to a terminal device of the user.

2. Description of the Prior Art

Conventionally, a Web server (a WWW server) is proposed that generates a Web page (a WWW page) responding to a parameter designated by a user operating a terminal device and transmits the Web page to the terminal device. For example, a Web server is proposed that searches a document containing a keyword from a database when a user designates the keyword, generates a Web page in which the result of the search is described, and transmits the Web page to a terminal device of the user.

As operating a Web server for generating a Web page in accordance with a parameter designated by a user, an administrator of the Web server may be asked by a user about the Web page that was transmitted to the terminal device. For example, an administrator of the Web server may receive a question about a method for dealing with a failure that is reported to the Web server. A report of the failure may include, for example, that there was no document found containing the entered keyword or that an error message was displayed though a keyword must have been inputted correctly.

However, in most cases, the user who made a question does not remember correctly the Web page that was displayed by the terminal device. Therefore, the administrator can obtain only ambiguous information about the failure, so it is difficult to answer the question of the user properly.

The device is proposed in Japanese unexamined patent publication No. 8-50555, in which historical information of user's operations and operational environment of an application program (environmental information) are recorded, so that the operations in the past can be reproduced in accordance with these information.

However, according to the device described in the above-mentioned document, since the operations in the past are reproduced while changing operational environment in accordance with the historical information and the environmental information, a system configuration and a process for the reproduction become complicated. Accordingly, a delay may be generated in a process of the entire device or management of information may become complicated.

SUMMARY OF THE INVENTION

An object of the present invention is to provide a Web server that can confirm contents of a Web page that was transmitted to a user more easily than the conventional method.

A Web server according to one embodiment of the present invention is a Web server that transmits a Web page to a terminal device of a user via a network. The Web server includes an operation portion for determining the entire or a part of contents of the Web page in accordance with a parameter designated by the user, a contents information process portion for making a storage portion store one or more contents information indicating the contents determined by the operation portion in connection with the Web page and the user, a Web page generation portion for generating the Web page in accordance with the contents information, and a transmission portion for transmitting the generated Web page to the terminal device of the user.

Preferably, the Web page generation portion generates the Web page by obtaining only contents information necessary for generating the Web page among the contents information from the contents information process portion, and the contents information process portion makes the storage portion store only the contents information given to the Web page generation portion among the contents information.

Furthermore, the Web server further includes a Web page regeneration portion for generating a Web page designated by an administrator among the Web pages in accordance with the contents information of the designated Web page stored in the storage portion.

It is possible to realize the Web server according to the present invention by a Web server having a function of a Java servlet. Namely, it is possible to provide the Web server according to the present invention with a business logic for determining the entire or a part of contents of the Web page in accordance with a parameter designated by the user, a contents information process logic for making a storage portion store one or more contents information indicating the contents determined by the business logic in connection with the Web page and the user, a screen generating logic for generating the Web page in accordance with the contents information, and a transmission logic for transmitting the generated Web page to the terminal device of the user.

Furthermore, the screen generating logic can be structured to generate the Web page by obtaining only contents information necessary for generating the Web page among the contents information from the contents information process logic, and the contents information process logic makes the storage portion store only the contents information given to the screen generating logic among the contents information. Furthermore, it is preferable to provide a replay logic for generating a Web page designated by an administrator among the Web pages in accordance with the contents information of the designated Web page stored in the storage portion.

A computer readable medium according to one embodiment of the present invention is a computer readable medium storing a computer program that is used for a computer having a function of a Java servlet for transmitting a Web page to a terminal device of a user via a network. The computer program makes the computer execute the process including the steps of providing a screen generating logic for generating the Web page with only contents information necessary for generating the Web page among one or more contents information indicating the entire or a part of contents of the Web page determined by a business logic in accordance with a parameter designated by the user, and making a storage portion store only the contents information given to the screen generating logic among one or more contents information in connection with the Web page and the user.

In the present invention, a Web page is transmitted to a terminal device as a hypertext described in a language such as HTML or XML. The designation of a user is performed by a user ID, for example. The designation of a Web page is performed by an ID of the Web page or a user ID of a terminal device that received the Web page, for example. Java, Java servlet, ASP (Active Server Pages) and others are trademarks or registered trademarks.

DESCRIPTION OF THE PREFERRED EMBODIMENTS

Hereinafter, the present invention will be explained more in detail with reference to embodiments and drawings.

Figure 1:
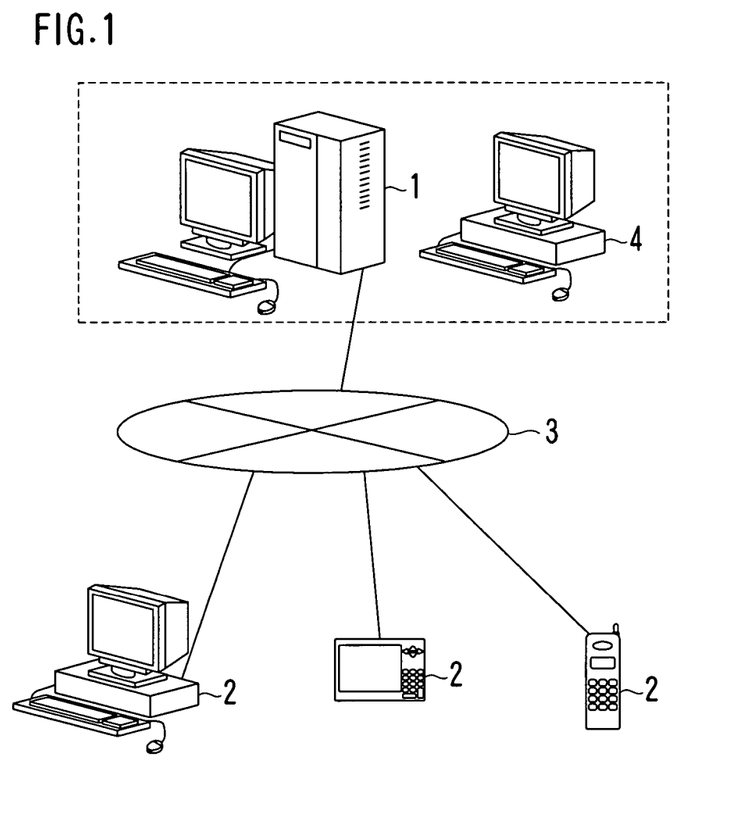
FIG. 1 shows an example of a network system including a Web server according to the present invention.
Figure 2:
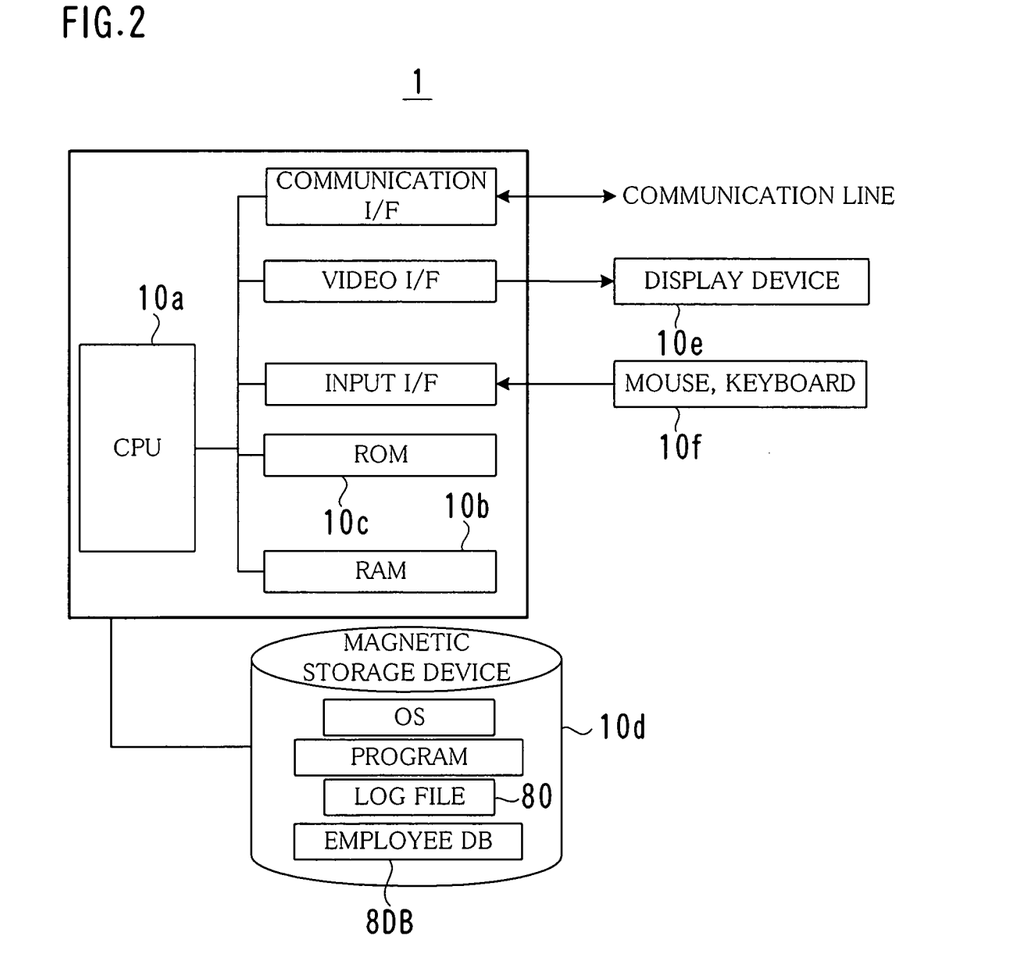
FIG. 2 shows an example of a hardware structure of the Web server.
Figure 3:
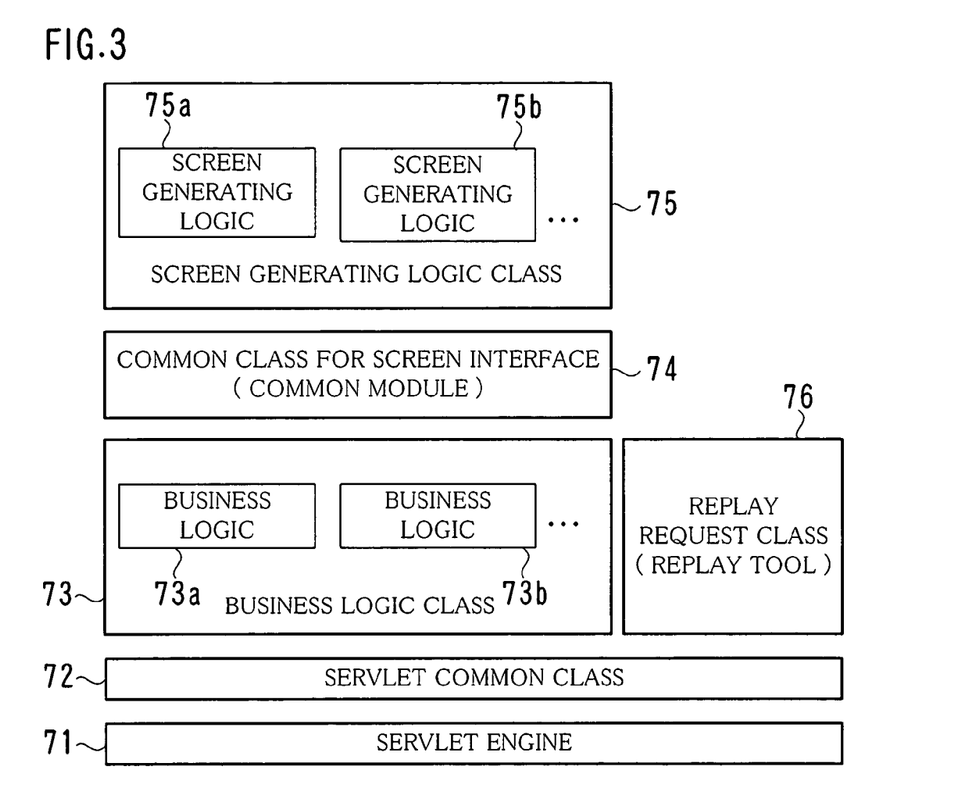
FIG. 3 shows an example of a program that is installed in a magnetic storage device.
Figure 4:
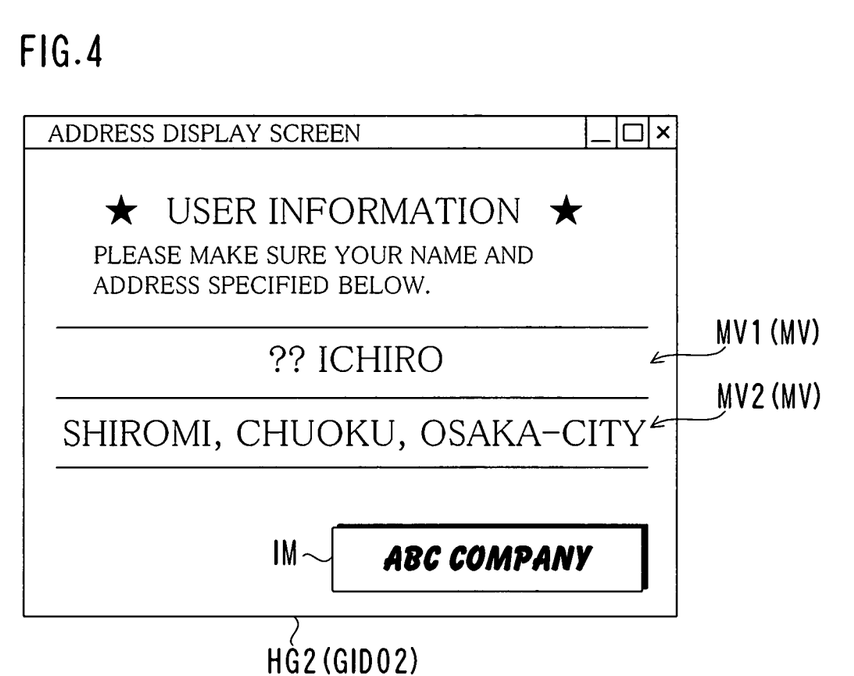
FIG. 4 shows an example of a search result screen that is one of Web pages.
Figure 5:
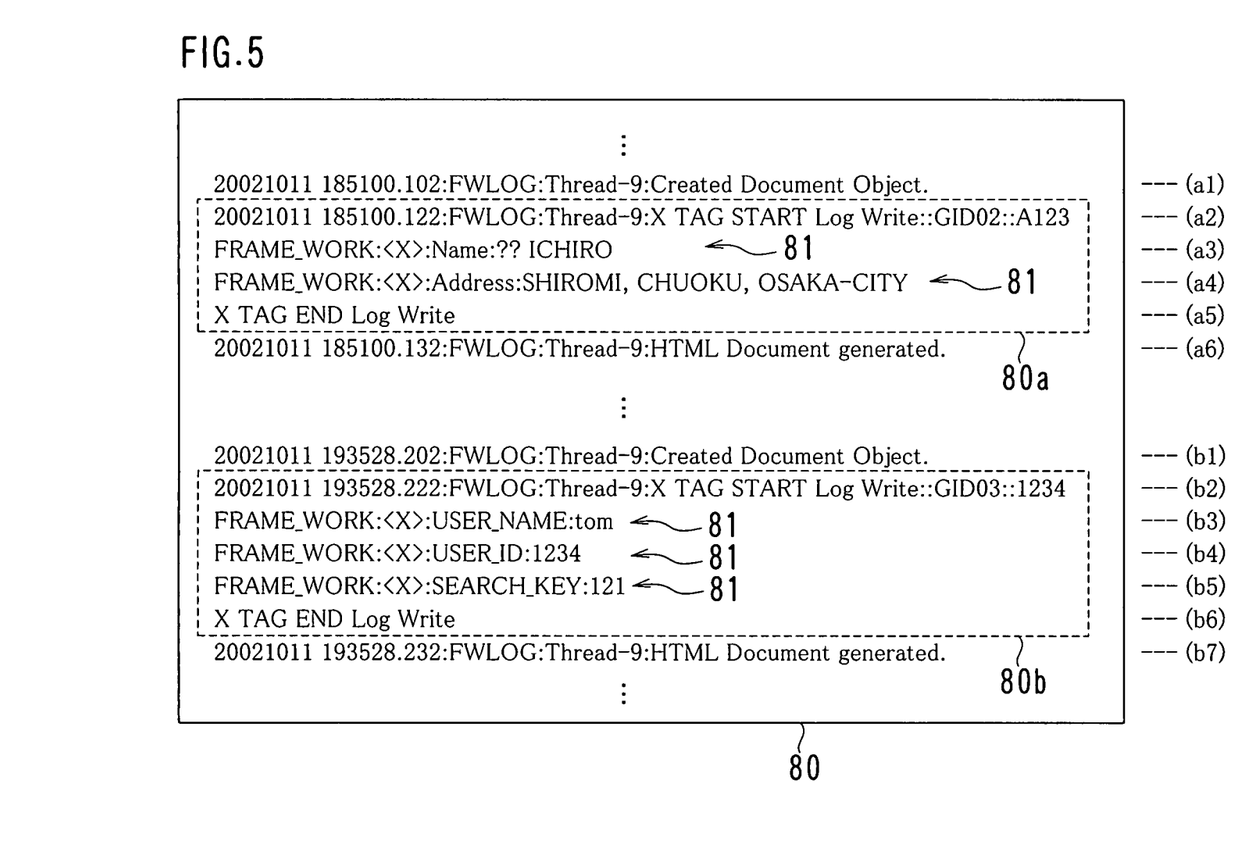
FIG. 5 shows an example of contents of a log file.

FIG. 1 shows an example of a network system including a Web server 1 according to the present invention, FIG. 2 shows an example of a hardware structure of the Web server 1, FIG. 3 shows an example of a program that is installed in a magnetic storage device 10d, FIG. 4 shows an example of a search result screen HG2 that is one of Web pages, and FIG. 5 shows an example of contents of a log file 80.

As shown in FIG. 1, the Web server 1 according to the present invention provides users of terminal devices 2 that can be connected to a network 3 with a Web page in which various types of information are described or a Web page for providing various services. In other words, the Web server 1 constitutes a Web site.

For example, the Web server 1 provides a Web page in which news, weather forecast, merchandise catalogs, or other information about academic research is described. Otherwise, the Web server 1 provides a Web page including text boxes for a user to enter a keyword, a user ID or the number of a bank account or other parameters that is necessary when the user wants to receive a service such as information searching, online shopping, an auction or online banking. Each of the Web pages is transmitted to the terminal device 2 as a hypertext described in a language such as a hypertext markup language (HTML) or an extensible markup language (XML).

A Web server in which a function of a Java servlet is installed can be used as the Web server 1. A workstation, a personal computer, a personal digital assistant (PDA) or a cellular phone in which a Web browser is installed can be used as the terminal device 2. Hereinafter, a case will be explained as an example in which an HTML hypertext (hereinafter referred to as an "HTML file") is generated by the Web server 1 in which the function of the Java servlet is installed, and the HTML file is transmitted to the terminal device 2.

The Web server 1 includes a CPU 10a, a RAM 10b, a ROM 10c, a magnetic storage device 10d, a display device 10e and an input device 10f such as a mouse or a keyboard as shown in FIG. 2. The magnetic storage device 10d stores an operating system (OS) and a program that is necessary for providing a Web page, as shown in FIG. 3. These programs are loaded into the RAM 10b when it is necessary and are executed by the CPU 10a. The magnetic storage device 10d also stores a log file 80 for recording processes that have been performed and an employee database 8 DB for managing personal information of each employee.

As shown in FIG. 3, a servlet engine 71 corresponds to a Java virtual machine (JVM) of the Java servlet. Furthermore, the servlet engine is called a servlet container in the servlet API 2.2 or later. The programs (modules, logics) including a servlet common class 72, a business logic class 73, a common class for a screen interface 74, a screen generating logic class 75 and a replay tool 76 are described in Java language.

The business logic class 73 is a class that performs a process for calculating a value to be displayed in a predetermined part of the Web page in accordance with the parameter designated by the terminal device 2. For example, the business logic class 73 includes plural programs (business logics 73a, 73b, . . . ) such as a program (a business logic 73a) for performing a process of user authentication in accordance with a user ID and a password that the user entered and a process of searching an address and a name of the user from the employee database 8 DB, or a program (a business logic 73b) for calculating an interest in accordance with an amount of savings that was entered. One or more results are obtained by performing the business logics. Hereinafter, a result of a process by the business logic is referred to as a "result information 81".

The screen generating logic class 75 is a class that performs a process for generating an HTML file for displaying a Web page (a screen) in accordance with the result information 81. For example, the screen generating logic class 75 includes plural programs (screen generating logics 75a, 75b, . . . ) such as a program (screen generating logic 75a) for generating an HTML file for displaying a Web page in which a name and an address of the user are described in accordance with the two result information 81 obtained by the process of the business logic 73a or a program (screen generating logic 75b) for generating an HTML file for displaying a Web page in which an interest is described in accordance with the result information 81 obtained by the process of the business logic 73b.

For example, if the two result information 81 indicating respectively a value "?? Ichiro" and a value "Shiromi, Chuoku, Osaka-city" are obtained by the process of the business logic 73a, an HTML file for displaying a Web page (a search result screen HG2) as shown in FIG. 4 is generated. Hereinafter, a part whose display content is changed responding to a result of the process by the business logic (result information 81) as the "?? Ichiro" and a value "Shiromi, Chuoku, Osaka-city" in the Web page is referred to as a "dynamic part" or a "variable part". In addition, a part except for the dynamic part in a Web page may be referred to as a "fixed part".

A combination of a business logic and a screen generating logic whose processes are linked like the combination of the business logic 73a and the screen generating logic 75a explained above is prepared for each Web page having a dynamic part (a variable part). Hereinafter, the business logics 73a, 73b, . . . as shown in FIG. 3 are regarded as being linked respectively with the screen generating logics 75a, 75b, . . . , in the explanation thereof.

The common class for a screen interface 74 is made of a program (a module or a logic) for performing a process for delivering the result information 81 obtained by the process of each business logic to a screen generating logic that is linked to the business logic. In other words, the common class for a screen interface 74 is positioned between the business logic class 73 and the screen generating logic class 75. The result information 81 is not given (set) to the screen generating logic directly from the business logic but is always given (set) via the common class for a screen interface 74. In this way, the Web server 1 of this embodiment is structured so that the business logic cannot access directly the screen generating logic.

Furthermore, the common class for a screen interface 74 performs a process of writing information among the result information 81 that was used for generating the dynamic part of the Web page into the log file 80. For example, in the case of the search result screen HG2 as shown in FIG. 4, the two result information 81 that were used respectively for generating two dynamic parts MV (MV1 and MV2) among plural result information 81 generated by the business logic 73a are written into the log file 80. Such a process is performed after the screen generating logic obtains the result information 81 from the common class for a screen interface 74 for generating the Web page. Even if the business logic 73a has made the result information 81 that is not used for generating the dynamic part MV, the result information 81 is not written into the log file 80.

The log file 80 is structured as shown in FIG. 5. For example, the data "20021011 ... 102" in the row (a1) indicate date and time when the process indicated by the log information in the row was performed. The log information 80a enclosed by the dotted line indicates that the screen generating logic 75a obtained the information for generating a dynamic part of the search result screen HG2 as shown in FIG. 4. The tag "X TAG START Log Write" in the row (a2) and the tag "X TAG END Log Write" in the row (a5) indicate respectively a start and an end of the log information 80a.

The portion "GID . . . " in the row (a2) or (b2) is a screen ID (GID) for distinguishing a generated Web page. For example, the portion "GID02" indicates a screen ID for distinguishing the search result screen HG2. Four digits of character string in the end of the row (a2) or (b2) is a user ID for distinguishing the user who requested the Web page corresponding to the screen ID of the row. For example, the portion "A123" in the row (a2) is a user ID of the user who made the request for the search result screen HG2.

The tag "FRAME_WORK:<X>:" indicates that a content (a value) of the result information 81 obtained by the screen generating logic is described after the tag. This result information 81 is described in a form like "identification name of the result information 81:value". For example, the rows (a3) and (a4) indicate that the result information 81 of identification names as Name and Address have values of "??Ichiro" and "Shiromi, Chuoku, Osaka-city", respectively.

As shown in FIG. 3, the servlet common class 72 is a class that performs a process for realizing a basic function of a Java servlet. In other words, the servlet common class 72 includes a program that is commonly used for providing the terminal device 2 with Web pages. For example, it includes a program for a process of giving a parameter obtained from the terminal device 2 to a business logic of a Web page that corresponds to the URL (Uniform Resource Locator) designated by the terminal device 2, a program for a process of transmitting an HTML file of a Web page generated by the screen generating logic to the terminal device 2 that made the request, and a program for initializing a class and others.

The replay tool 76 is a program (or a logic) that performs a process for reproducing the Web page that was transmitted to the terminal device 2 in the past when the administrator of the Web server 1 or others make the request. The reproduced Web page is used as a reference material when the administrator deals with a troubleshooting.

Figure 6:
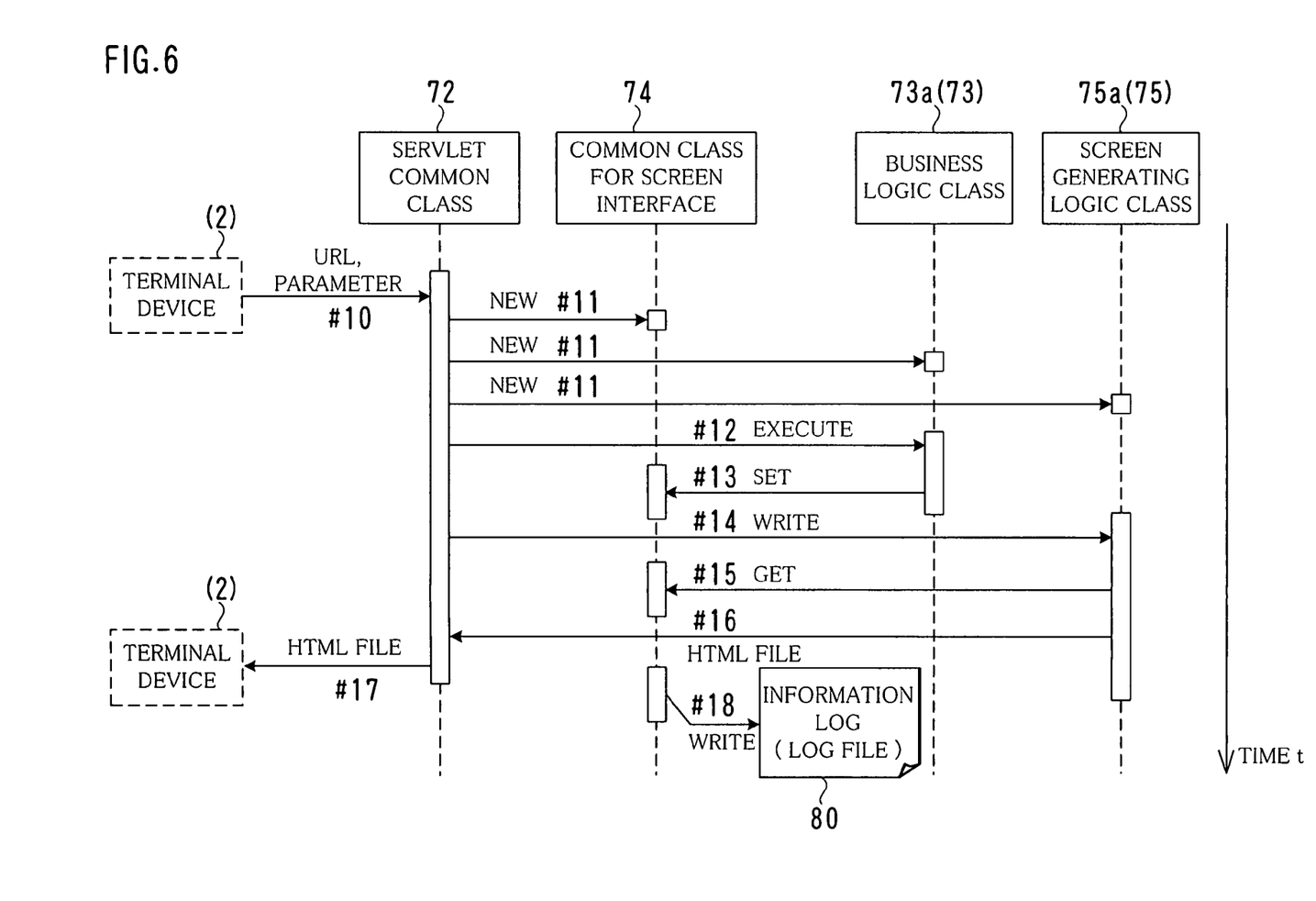
FIG. 6 is a flowchart for explaining an example of a process of the Web server when generating a Web page that is transmitted to a terminal device.
Figure 7:
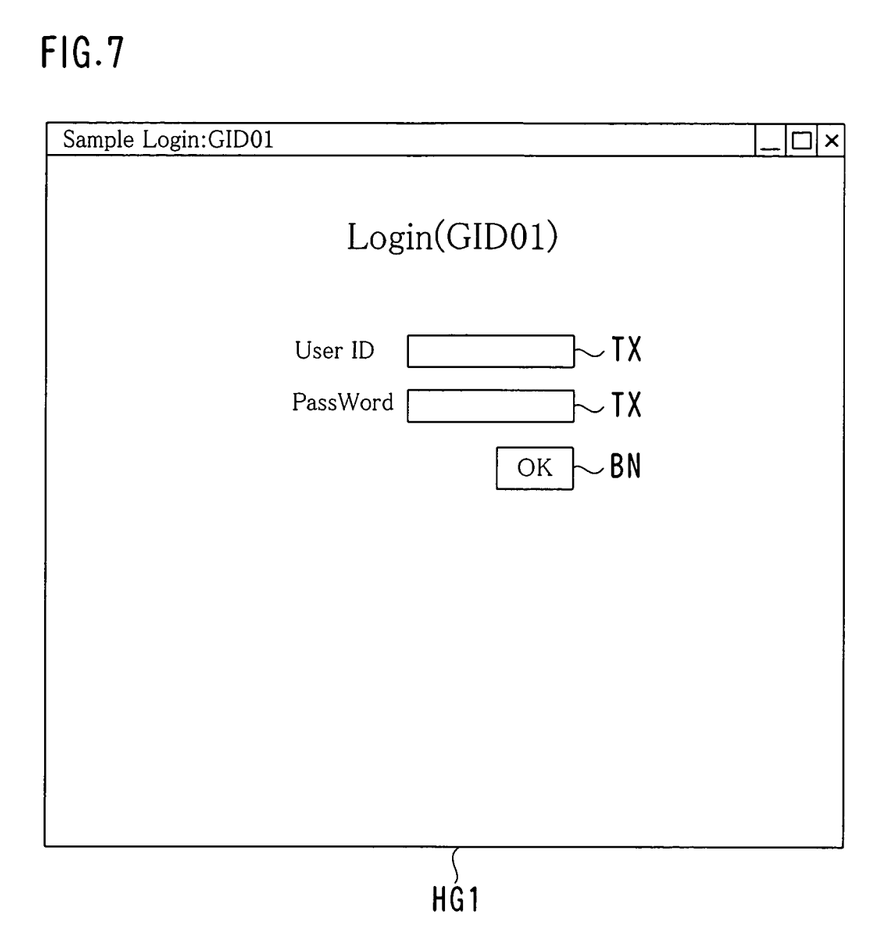
FIG. 7 shows an example of a login screen.

FIG. 6 is a flowchart for explaining an example of a process of the Web server 1 when generating a Web page that is transmitted to the terminal device 2, and FIG. 7 shows an example of a login screen HG1.

Next, a case where a search result screen HG2 as shown in FIG. 4 is generated as a Web page and is transmitted to the terminal device 2 will be explained as an example with reference to the flowchart showing the process of the Web server 1.

As shown in FIG. 6, when receiving a URL for designating the search result screen HG2 and a designation of parameters (a user ID and a password) from the terminal device 2 (#10), the servlet common class 72 performs a process for initialization (#11). For example, it resets variables and others that are used in a program of the business logic class 73 for determining a dynamic part of the search result screen HG2 (a business logic 73a), a program of the common class for a screen interface 74, and a program of the screen generating logic class 75 that is linked to the business logic 73a (a screen generating logic 75a).

A user of the terminal device 2 inputs and designates a URL and a parameter in the Web browser in a form of "URL/ parameter", e.g., in a form of "http://www.abcde.ne.jp/shop/ servlet/App?User_ID=A123& . . . ". Alternatively, the user may designate a URL and a parameter by entering a parameter in each text box TX in the log-in screen HG1 as shown in FIG. 7 and by clicking a button BN that is linked to the URL of the search result screen HG2.

When finishing the initialization process, the business logic 73a is performed in accordance with the designated user ID and password (#12). In this way, a user authentication process is performed in the terminal device 2. When it is confirmed that the user is an authorized user, a name and an address of the user are extracted from the employee database 8 DB.

The execution result (the result information 81) of the business logic 73a is set to the common class for a screen interface 74 (#13). Here, the two result information 81 indicating the name and the address are set in the common class for a screen interface 74. They are set by storing each of the result information 81 in local variables of the common class for a screen interface 74 in the names of "Name" and "Address" for example.

The servlet common class 72 receives a notice indicating that the business logic 73a finished the process and then requests (instructs) the common class for a screen interface 74 to generate an HTML file for displaying a Web page of the URL designated by the user, i.e., the search result screen HG2 (#14).

Here, the screen generating logic 75a is performed. Namely, the screen generating logic 75a obtains result information 81 that is necessary for generating a dynamic part of the search result screen HG2 among result information 81 set by the common class for a screen interface 74 in Step #13 (#15). Then, the HTML file of the search result screen HG2 is generated in accordance with the obtained result information 81 (#16).

The generated HTML file is transmitted by the servlet common class 72 to the terminal device 2 of the user who made the designation (#17). The two result information 81 (the name and the address) that were obtained by the screen generating logic 75a and were used for generating the dynamic part of the search result screen HG2 are written into the log file 80 together with the obtained date and time, the screen ID of the search result screen HG2, the user ID of the user who made the designation and others (#18). The writing process is performed in parallel with the process in Step #16 or #17, or they are performed in series.

Figure 8:
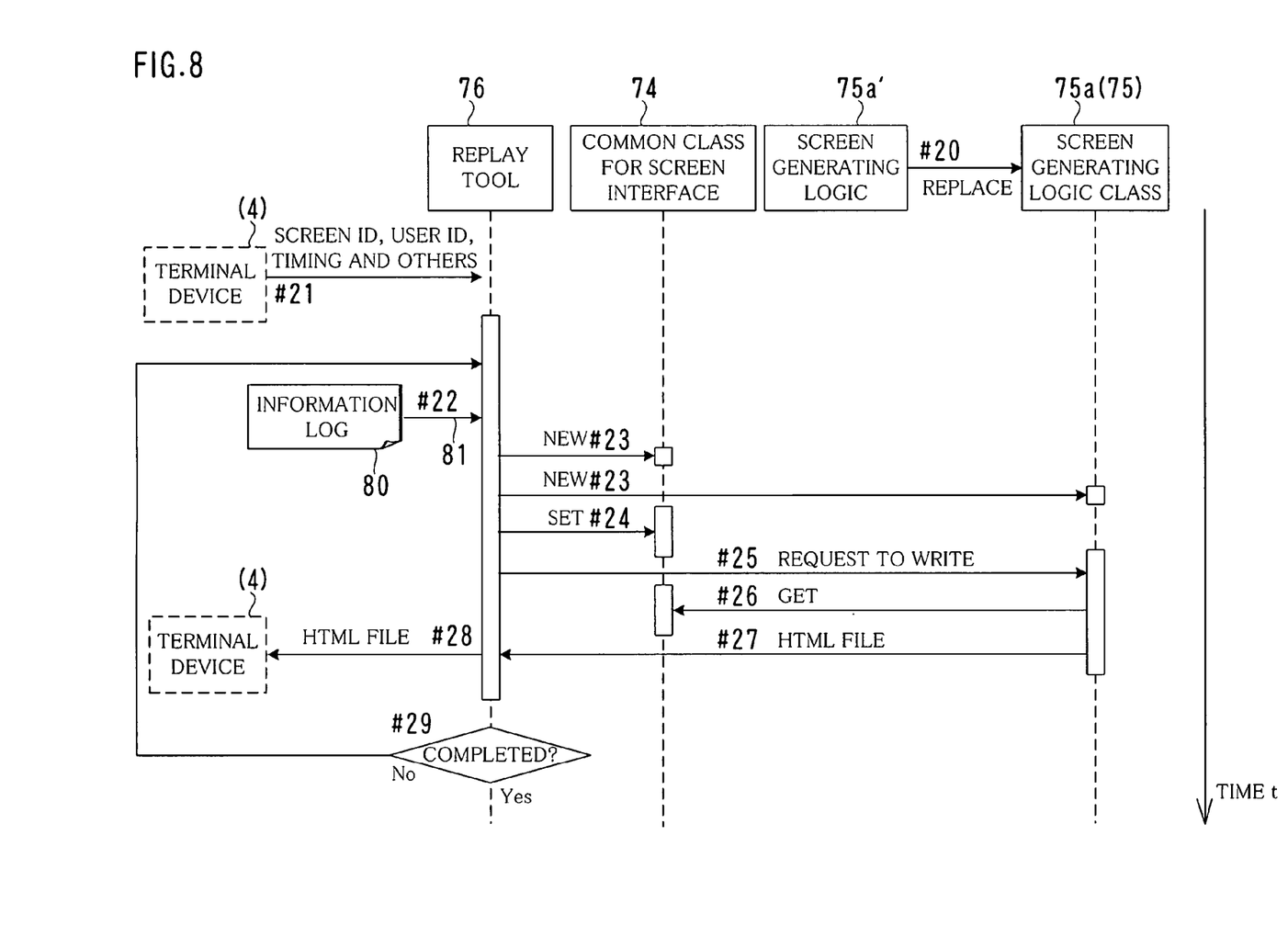
FIG. 8 is a flowchart for explaining a process of the Web server when a Web page is reproduced.
Figure 9:
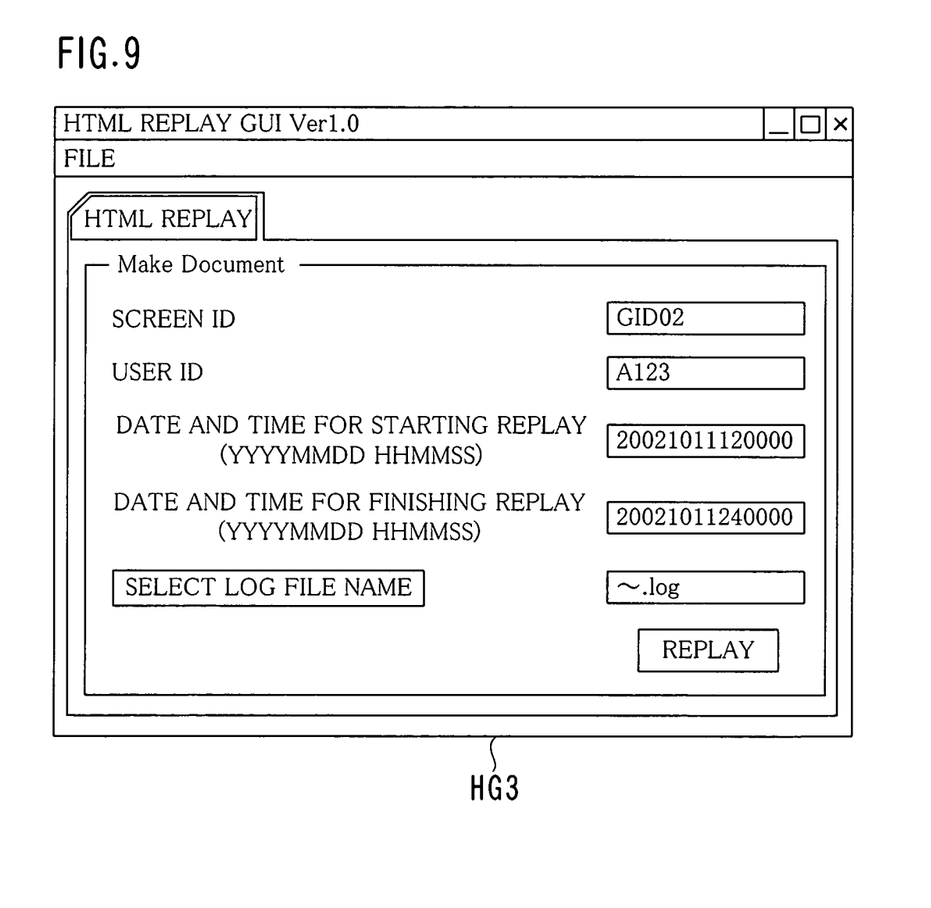
FIG. 9 shows an example of a replay designation screen.
Figure 10:
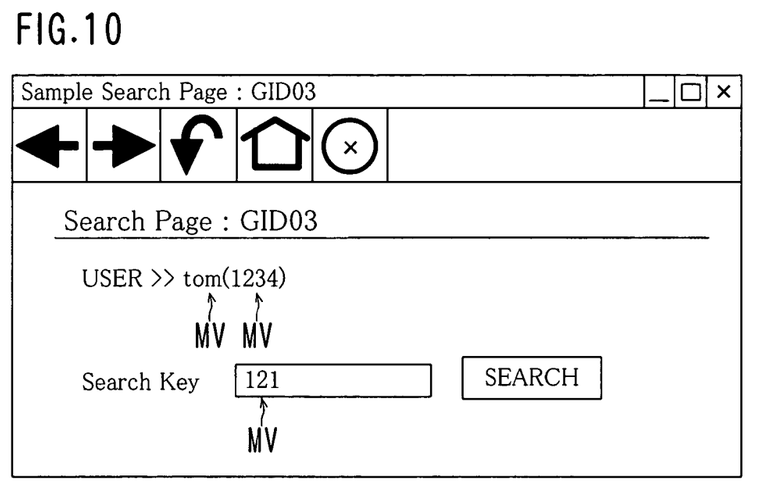
FIG. 10 shows an example of a reproduced Web page.

FIG. 8 is a flowchart for explaining a process of the Web server 1 when a Web page is reproduced, FIG. 9 shows an example of a replay designation screen HG3, and FIG. 10 shows an example of a reproduced Web page. Next, a process of the Web server 1 when reproducing a Web page that was transmitted to the terminal device 2 in the past will be explained with reference to the flowchart.

For example, it is supposed that the administrator of the Web server 1 has received a question from a user of a terminal device 2 concerning possibility of an error in the search result screen HG2 (see FIG. 4) that was displayed by the Web browser. Then, the administrator makes a terminal device 4 of the administrator reproduce the search result screen HG2 that the user viewed actually by the Web browser in the following procedure so as to deal with the question.

As shown in FIG. 8, the administrator of the Web server 1 designates three items including a screen ID corresponding to the search result screen HG2 to be reproduced, a user ID of the user who made the question and a timing when the user received the Web page from the Web server 1 by entering each of them in each text box TX of the replay designation screen HG3 as shown in FIG. 9 (#21). Furthermore, the administrator does not need to designate all the three items, but at least one item. For example, if the user does not remember exactly in which Web page the error occurred, it is sufficient to designate a user ID and a timing. In addition, the administrator may designate not only the Web page that the user pointed as having an error but also some Web pages that the user viewed before and after the Web page, so that a series of Web pages that the user viewed are reproduced for facilitating the identification of a cause of the error.

The replay tool 76 is performed so that all log information satisfying all conditions of the designated screen ID, user ID, and timing is extracted from the log file 80 (see FIG. 5) (#22). For example, if a condition that the screen ID is GID02, the user ID is A123 and the timing is 12-24 o'clock on Oct. 11, 2002 is designated, the log information 80a is extracted. In parallel or in series with the process in Step #22, the process for initialization of the common class for a screen interface 74 and the screen generating logic class 75 is performed (#23).

The two result information 81 indicated by the extracted log information 80a are set in the common class for a screen interface 74 (#24), and the screen generating logic 75a is required to generate an HTML file of the search result screen HG2 (#25). Then, the two result information 81 obtained from the log file 80 is delivered from the common class for a screen interface 74 (#26), and the screen generating logic 75a generates the HTML file of the search result screen HG2 in accordance with the result information 81 (#27). The generated HTML file is transmitted by the replay tool 76 to the terminal device 4 of the administrator (#28). Then, a Web page that is the same as the search result screen HG2 that the user viewed is displayed by the Web browser of the terminal device 4.

If the process of generating an HTML file is performed for all the log information extracted in Step #22 (Yes in #29), the process is completed. Otherwise (No in #29), the process from Step #22 through Step #28 is repeated in accordance with the remaining log information. Then, the administrator of the Web server 1 deals with the question asked by the user while viewing the reproduced Web page.

In the same way, if the condition that the screen ID is GID03 and the user ID is 1234 is designated for example, the log information 80b is extracted, and the Web page as shown in FIG. 10 is reproduced in accordance with the extracted information.

Furthermore, there is a case where an image or others in the reproduced Web page is not displayed well by a terminal device under an environment where the system is being developed or tested (hereinafter referred to as a "test environment"). For example, there are such cases where a firewall prevents the terminal device 4 from being connected to the Internet or data transmission by HTTP is prohibited from the Internet to a local area network (a LAN or an intranet) including the terminal device 4.

Therefore, after the process of generating an HTML file (#27), the following process may be performed for example. First, a URL indicating a location of storing images or others is extracted from the generated HTML file. For example, in the case of the HTML file of the search result screen HG2 as shown in FIG. 4, a URL such as "<IMG scr="/images/a.gif">" that indicates a location of storing a file of an image IM is extracted. The portion "/images/a.gif" is described as a relative path, which is converted into a URL having the absolute path "http://www.abcde.ne.jp/images/a.gif".

A path name of the extracted URL is replaced with a path name that indicates a location of storing a file of the image IM in the test environment. For example, if the file of the image IM is stored in a folder (a directory) named "test" in the C drive of the terminal device 4, the path name is replaced like "<IMG scr="C:/test/a.gif>"". Then, the HTML file after the path name is replaced is transmitted (#28).

According to the process as shown in FIG. 8, when the design of a Web page is changed, the administrator of the Web server 1 can check whether or not the new Web page is displayed correctly. For example, it is supposed that a Web designer changed the design of the search result screen HG2, and a programmer revised the screen generating logic 75a into a screen generating logic 75a' in accordance with a new design.

The administrator of the Web server 1 may replace the screen generating logic 75a with a new screen generating logic 75a' (#20). Then, the process from Step #21 through Step #28 is performed in accordance with the screen generating logic 75a'. Thus, the Web page (the search result screen HG2) that was provided to the user in the past is reproduced as a new Web page after redesign. The administrator can compare the Web pages before and after redesign with each other so as to check easily whether the redesign was performed well.

According to this embodiment, the result information 81 indicating contents of a dynamic part of a Web page can be recorded in the log file 80. Thus, the administrator of the Web server 1 can obtain a document easily for specifying a cause of an error or a failure of a Web page that was transmitted to a user in the past. In addition, since the Web page can be reproduced easily, the administrator can specify a cause of an error or a failure of a Web page easily.

In addition, all the result information 81 that was used for generating a Web page can be recorded. Since a Web page can be reproduced even if a fixed part of the generated Web page was not recorded, contents of the log file 80 can be organized.

Figure 11:
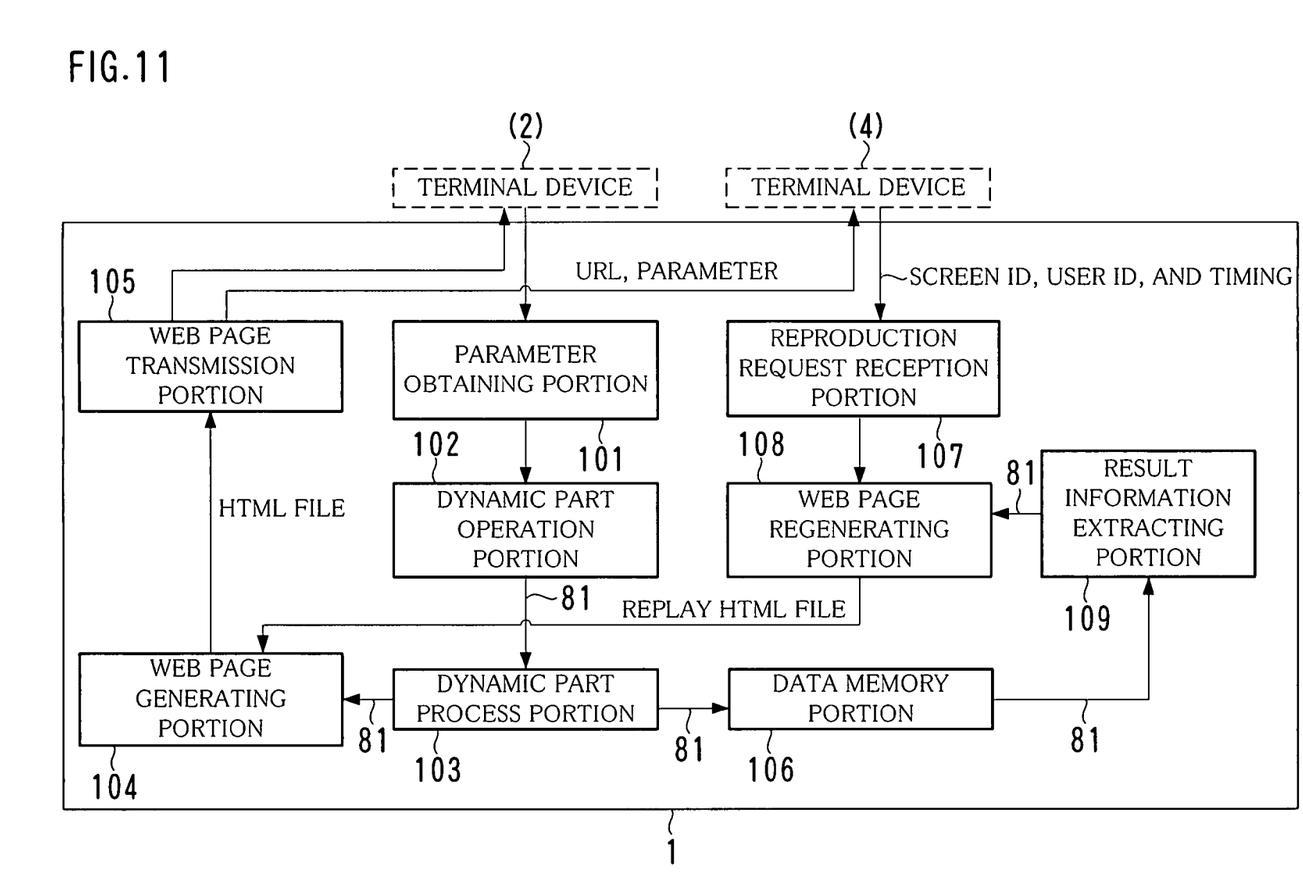
FIG. 11 shows an example of a functional structure of the Web server.

FIG. 11 shows an example of a functional structure of the Web server 1. The Web server 1 in this embodiment has a function of a Java servlet. However, it is possible to describe the program in a language except Java, e.g., C++, Perl, or ASP (Active Server Pages) provided by Microsoft Corp. as shown in FIG. 3, so as to constitute the same function as the Web server 1 in this embodiment. In this case, it is not required that the program as shown in FIG. 3 corresponds to a program described in C++ or other languages one by one. More specifically, it is sufficient to program so that the functions as shown in FIG. 11 are realized.

A parameter obtaining portion 101 performs a process of obtaining a URL and a parameter of a Web page desired by a user from the terminal device 2 and a process of initialization (corresponding to the process of steps #10 and #11 in FIG. 6).

A dynamic part operation portion 102 performs a process of operation for the dynamic part of the Web page in accordance with the designated parameter and transmits the operation result, i.e., the result information 81 to a dynamic part process portion 103 (steps #12 and #13).

The dynamic part process portion 103 makes a request to a Web page generating portion 104 for generation of an HTML file of a Web page desired by the user (step #14). The Web page generating portion 104 receives only the necessary result information 81 from the dynamic part process portion 103 and generates an HTML file in accordance with the information (steps #15 and #16). The received result information 81 is stored in a data memory portion 106 (step #18). The generated HTML file is transmitted to the terminal device 2 by the Web page transmission portion 105 (step #17).

A reproduction request reception portion 107 obtains a condition about a screen ID of a Web page that is provided to the user in the past and that the administrator wants to reproduce, a user ID of the user and a time when the user received the Web page from the terminal device 4 (step #21 in FIG. 8). A result information extracting portion 109 extracts an information log that satisfies the condition from the log file 80. Then, it performs a process of initialization and requests a Web page regenerating portion 108 to generate an HTML file of the Web page (steps #22 through #25).

The Web page regenerating portion 108 receives extracted result information 81 via the result information extracting portion 109 and regenerates the HTML file in accordance with the information (steps #26 and #27). The generated HTML file is transmitted to the terminal device 4 by the Web page transmission portion 105 (step #28).

Furthermore, in the Web server 1 of this embodiment that has a function of a Java servlet, the parameter obtaining portion 101 and the Web page transmission portion 105 as shown in FIG. 11 are realized mainly by performing a program of the servlet common class 72 as shown in FIG. 3. The dynamic part operation portion 102 is realized mainly by performing a program of the business logic class 73. The dynamic part process portion 103 is realized mainly by performing programs of the servlet common class 72 and the common class for a screen interface 74. The Web page generating portion 104 and the Web page regenerating portion 108 are realized mainly by performing a program of the screen generating logic class 75. The data memory portion 106 is realized mainly by the log file 80. The reproduction request reception portion 107 is realized mainly by performing a program of the replay tool 76. The result information extracting portion 109 is realized mainly by performing programs of the common class for a screen interface 74 and the replay tool 76.

Furthermore, it is possible to modify the structure of the Web server 1 entirely or partially, the structure and the contents of each class, the structure and the contents of the log file 80, the contents of the process, the order of the process, the language that is used, or others in accordance with the intention of the present invention.

According to the present invention, it is possible to confirm contents of a Web page that was transmitted to a user more easily than the conventional method. In addition, it is possible to record all information that was used for generating a Web page. Furthermore, it is possible to reproduce a Web page transmitted to a user in the past.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A Web server comprising:
    an input portion that receives a parameter inputted by a first terminal device via a network, the inputted parameter corresponding to a user identification identifying a first user operating the first terminal device;
    an operation portion that determines dynamically-altered contents based on execution of an application in accordance with the inputted parameter and the user identification of the first user;
    a Web page generation portion that generates a Web page including the dynamically-altered contents and fixed part contents;
    a contents information process portion that stores the dynamically-altered contents, in association with a time of generation of the Web page, a screen ID identifying the generated Web page and the user identification of the first user to a storage portion of the Web server;
    a Web page transmission portion that transmits the generated Web page to the first terminal device;
    a designation reception portion that receives, from a second terminal device operated by a second user being different from the first user, at least one of a designation of the time, the screen ID and the user identification of the first user, which are used to search for the dynamically-altered contents stored in the storage portion of the Web server;
    a contents information extraction portion that extracts, from the storage portion of the Web server, the dynamically-altered contents corresponding to at least one of the received time, the received screen ID and the received user identification of the first user;
    a Web page regeneration portion that regenerates a screen of the generated Web page transmitted to the first terminal device, by incorporating therein the dynamically-altered contents which are extracted from the storage portion by the contents information extraction portion, and fixed part contents; and
    a regenerated Web page transmission portion that transmits the screen of the regenerated Web page to the second terminal device operated by the second user different from the first user.

2. The Web server according to claim 1, wherein the Web page regeneration portion regenerates for the second user, the Web Page originally generated for the first user.

3. The Web server according to claim 1, wherein the Web page regeneration portion regenerates contents of the Web page as previously viewed by the first user.

4. A method comprising:
    receiving, by a computer, a parameter inputted by a first terminal device via a network, the inputted parameter corresponding to a user identification identifying a first user operating the first terminal device;
    generating, by the computer, a web page including dynamically altered content and fixed part contents in accordance with the inputted parameter;
    storing into a storage portion connected with the computer, the dynamically altered content corresponding with each of the user identification of the first user, a date and time, and a screen ID;
    transmitting, by the computer, the generated web page to the first terminal device;
    receiving, by the computer, from a second terminal device operated by a second user being different from the first user, at least one of the user identification of the first user, the date and time when the dynamically altered content was obtained, and the screen ID identifying the generated web page;

regenerating, by the computer, a screen of the generated web page transmitted to the first terminal device having the dynamically altered content which are extracted from the storage portion based on the at least one of the user identification of the first user received from the second terminal device, the received date and time, and the received screen ID, and fixed contents; and transmitting, by the computer, the screen of the regenerated web page to the second terminal device operated by the second user different from the first user.

5. The method according to claim 4, wherein the computer is a web server having a function of a Java servlet.

6. The method for regenerating a web page according to claim 4, comprising identifying a cause of an error in the dynamically altered content by a user of the second terminal device from the web page transmitted to the second terminal device.

7. The method according to claim 4, wherein the regenerating regenerates for the second user, the Web Page originally generated for the first user.

8. The method according to claim 4, wherein the regenerating regenerates contents of the Web page as previously viewed by the first user.

9. A non-transitory computer-readable storage medium storing a program for use in a computer, the program which when executed by the computer, causes the computer to perform a process comprising:

receiving, from a first terminal device via a network, a parameter corresponding to a user identification identifying a first user operating the first terminal device;

generating a web page including dynamically altered content and fixed part contents in accordance with the inputted parameter;

storing into a storage portion connected with the computer, the dynamically altered content corresponding with each of the user identification of the first user, a date and time, and a screen ID;

transmitting the generated web page to the first terminal device;

receiving from a second terminal device operated by a second user being different from the first user at least one of the user identification of the first user, the date and time when the dynamically altered web content was obtained, and the screen ID identifying the generated web page;

regenerating a screen of the generated web page transmitted to the first terminal including the dynamically altered content which are extracted from the storage portion based on the at least one of the user identification of the first user received from the second terminal device, the received date and time, and the received screen ID, and fixed part contents; and transmitting the screen of the regenerated web page to the second terminal device operated by the second user different from the first user.

10. The computer-readable storage medium according to claim 9, wherein the computer is a web server having a function of a Java servlet.

11. The computer-readable storage medium according to claim 9, wherein the regenerating regenerates for the second user, the Web Page originally generated for the first user.

12. The computer-readable storage medium according to claim 9, wherein the regenerating regenerates contents of the Web page as previously viewed by the first user.

* * * * *